United States Patent [19]

Wheatley, Jr.

[11] 3,720,228

[45] March 13, 1973

[54] FULL-BORE PIPELINE CHECK VALVES ADAPTED FOR REARRANGEMENT INTO ALTERNATIVE BODY STYLES

[76] Inventor: Thomas Wheatley, Jr., 8015 Meadowglen, Houston, Tex. 77042

[22] Filed: Nov. 19, 1971

[21] Appl. No.: 200,480

Related U.S. Application Data

[63] Continuation-in-part of Ser. No. 121,877, March 8, 1971, which is a continuation-in-part of Ser. No. 23,818, March 30, 1970, abandoned.

[52] U.S. Cl. ............137/454.2, 137/515.7, 137/268, 15/104.06
[51] Int. Cl.................................................F16k 15/03
[58] Field of Search.....137/515.7, 527.8, 268, 454.2, 137/515, 515.3, 515.5, 527, 527.2, 527.4; 251/299, 298, 303; 15/104.06

[56] References Cited

UNITED STATES PATENTS

| 2,018,769 | 10/1935 | Tryon | 137/515.7 |
|---|---|---|---|
| 2,969,492 | 1/1961 | Wheatley | 137/527.4 |
| 3,100,308 | 8/1963 | De Sena | 15/104.06 A |
| 3,509,908 | 5/1970 | Latham et al. | 137/515 X |
| 3,565,107 | 2/1971 | Bunch | 137/515.7 |
| 3,074,427 | 1/1963 | Wheeler, Jr. | 137/454.2 X |
| 3,166,094 | 1/1965 | Eagleton | 137/544 |

Primary Examiner—Henry T. Klinksiek
Assistant Examiner—Robert J. Miller
Attorney—Ernest R. Archambeau, Jr. et al.

[57] ABSTRACT

As a representative embodiment of the new and improved full-opening pipeline valve disclosed herein, a tubular valve body is formed of three separable full-bore members adapted to pass pipeline pigs and having a combined axial length corresponding to the standard overall length established by industry for both flanged and weld-end valves of that pipe size and pressure rating. The body members can be alternatively arranged into either of two body styles to enable the full-opening valve to be either welded into a pipeline or bolted into position between a spaced pair of opposed pipeline flanges. The body members include an annular member carrying a pivoted valve disc, with this body member being uniquely adapted to be clamped between a flanged body member and either another flanged body member or a pipeline flange depending upon which body style is required for mounting the full-bore valve in a given pipeline. In either of these body styles, the unique annular body member is wholly confined within the flange bolts so that this body member can be conveniently removed or the pivotally-supported valve disc may be selectively oriented to different angular positions as required to assure the passage of pipeline pigs by simply loosening the flange bolts and rotating the annular body member in relation to the other body members.

17 Claims, 3 Drawing Figures

PATENTED MAR 13 1973  3,720,228

FULL-BORE PIPELINE CHECK VALVES ADAPTED FOR REARRANGEMENT INTO ALTERNATIVE BODY STYLES

This application is a continuation-in-part of application Ser. No. 121,877 filed Mar. 8, 1971, which was a continuation-in-part of application Ser. No. 23,818 filed Mar. 30, 1970 (now abandoned).

In the pipeline industry, so-called "pipeline pigs" are often dispatched by pressure through a pipeline for either separating fluids passing through the pipeline or removing unwanted matter or the like from its interior wall. In either case, it will be appreciated that unless these pigs remain in substantially sealing contact with the pipeline wall, a sufficient pressure differential cannot be maintained across the pig to assure its continued passage through the pipeline. Thus, since check valves must be installed at spaced intervals in long pipelines, these check valves must be specially designed to allow pipeline pigs to pass freely through the pipeline.

Accordingly, the usual practice heretofore has been to employ full-opening check valves such as those shown in U.S. Pat. Nos. 2,969,492 and 3,169,263 which are particularly arranged for passing pipeline pigs. As disclosed in these patents, these swing check valves typically include a cast or integral tubular valve body having aligned inlet and outlet ports and an upwardly-enlarged central portion which is sized to allow a depending pivoted valve disc to swing upwardly above the flow passage through the valve body. In this manner, as a pig passes through the valve, its forward movement will hopefully swing the pivoted valve disc away from the valve seat and upwardly into the enlarged central portion. Once the pig has passed through the valve, the swinging disc will return to an intermediate position dictated by the continued flow of the pipeline fluids.

Although check valves of this nature have been accepted by the industry, those skilled in the art nevertheless recognize that these valves are inadequate in many respects. For example, the degree of obstruction to the passage of a pipeline pig which is presented by a valve of this nature is directly proportional to the weight of its swinging disc and the angular position of the disc in relation to the vertical. In other words, for a given check valve, more force will be required to push a pipeline pig through the valve if its swinging disc is pivoted for swinging in a vertical arc than where the disc is pivoted for swinging in an inclined arc. It will be recognized, however, that once one of these swing check valves is permanently welded into a pipeline, the angular orientation of its pivoted disc is fixed and no subsequent adjustment can be made without cutting the valve out of the line and rewelding it in another angularly-oriented position. Flanged valves can, of course, be repositioned to change their angular orientation; but the larger sizes of these valves are, of course, so bulky that such changes are very difficult to make. Thus, from a practical standpoint, typical swing check valves are rarely, if ever, repositioned to facilitate the passage of pipeline pigs through them.

Those skilled in the art will also recognize that a conventional pipeline may alternatively employ either flanged or so-called "weld-end" valves. Thus, heretofore, it has been necessary for manufacturers to provide both flanged and weld-end valves for each of the many standard sizes and pressure ratings commonly required for pipelines. Such duplication is obviously expensive if complete inventories are to be maintained by manufacturers and suppliers of such valves.

Accordingly, it is an object of the present invention to provide new and improved easily fabricated full-opening check valves which are uniquely arranged to facilitate either the replacement or the repositioning of their pivoted discs without having to remove the valves from a pipeline.

It is a further object of the present invention to provide new and improved full-opening check valves which are especially designed for passing pipeline pigs and are adapted to be alternatively arranged for convenient installation in a pipeline by means of either standard flanges or by welding as dictated by the particular construction of the pipeline.

These and other objects of the present invention are attained by providing a selectively-arrangeable full-opening check valve which is adapted to be coupled between opposed end sections of a pipeline and is comprised of an easily fabricated three-part tubular body including a standard pipe flange having an internal diameter substantially equal to that of the pipeline, an annular body of uniform thickness having a coaxial valve seat of substantially-equal diameter, and an elongated tubular member having a flanged enlarged-diameter end portion with an outside diameter and a bolt circle generally corresponding to those of the pipe flange and which is joined by a symmetrically-shaped converging intermediate portion to a reduced-diameter end portion having an internal diameter substantially equal to that of the pipeline. A circular valve disc is pivotally mounted within a coaxial counterbore formed in the downstream face of the annular body and adapted for movement between a closed position in seating engagement with the valve seat and a fully-open position where the valve member is extended upwardly into the enlarged portion of the tubular member to permit the passage of pipeline pigs. Where the new and improved check valve is to be welded into a pipeline, the pipe flange is welded to one of the opposed end sections of the pipeline and the reduced end portion of the elongated tubular member is welded to the other end section of the pipeline. The annular body member is then clamped in sealing relationship between the pipe flange and the flanged end of the tubular body member. On the other hand, where the check valve of the present invention is to be mounted between two spaced flanges in the pipeline, the pipe flange included with the valve body is welded to the reduced end of the tubular body member and bolted to the downstream pipeline flange. The annular body member is then clamped in sealing relationship between the flanged end of the tubular body member and the upstream pipeline flange.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

Figure 1:
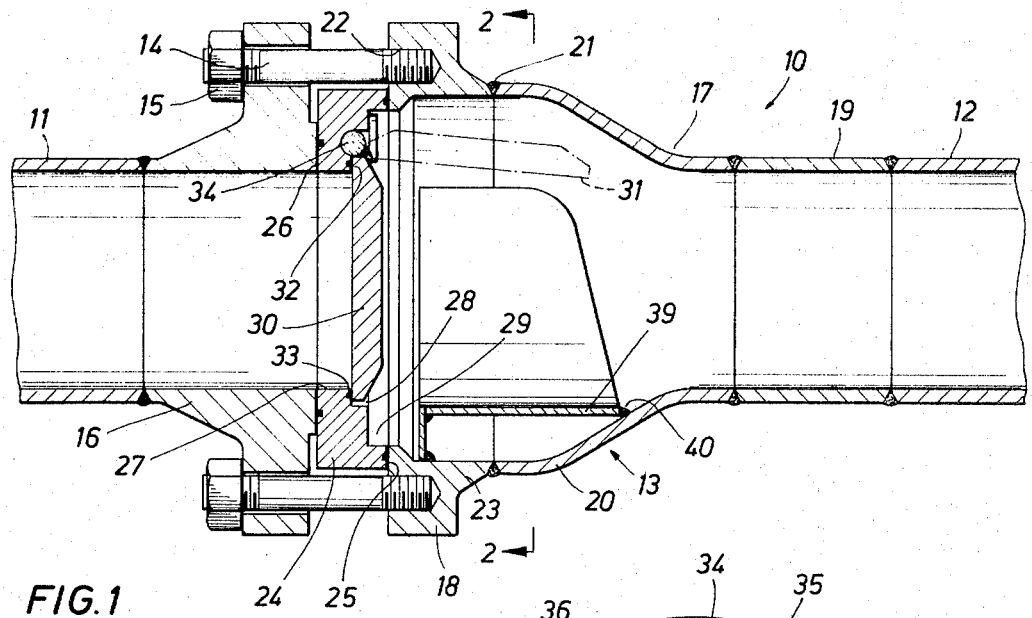
FIG. 1 is an elevational view in cross-section of a new and improved full-opening valve of the present invention when it is arranged to be welded into a pipeline.

Turning now to FIG. 1, a new and improved full-opening check valve 10 arranged in accordance with the principles of the present invention is depicted as it will appear when it is to be welded between two opposed end sections 11 and 12 of a typical pipeline through which pipeline pigs are to be passed. As illustrated, the check valve 10 includes a tubular body shown generally at 13 and having three separable body members which are joined end-for-end in coincidental alignment by a plurality of typical stud bolts 14 and nuts 15. The first part of the valve body 13 is comprised of a typical commercially-available pipe flange 16 of standard dimensions and a pressure rating respectively corresponding to industry standards established for the pipe size and pressure rating of the two pipeline sections 11 and 12. Although the particular flange 16 illustrated in FIG. 1 is a so-called "welding neck" flange, it will be recognized that this flange could just as well be either a so-called "slip-on" flange or a "socket-type" flange of an equal pipe size and pressure rating. Thus, as far as the purposes of the present invention are involved, it is essential only that the flange 16 be a forged welding flange of a standard design so that it will be compatible with any standard commercially-available flange of the same pipe size and pressure rating.

The second part of the valve body 13 is an elongated tubular member 17 having a specially-designed enlarged-diameter flange 18 on one end which is joined to a reduced-diameter end portion 19 by a symmetrically-converging central portion which, for the purposes of the invention, is a commercially-available concentric reducer weld fitting 20 of a suitable size and pressure rating commensurate with the service requirements of the valve 10. For the purposes of the present invention, it is essential that the smaller end portion 19 be a short length of pipe of the same pipe size as the pipeline section 12 and that the smaller end of the concentric reducer 20 also be of this same pipe size. The pipe size of the larger end of the concentric reducer 20 must, of course, be greater than the pipe size of the pipeline section 11. The larger end of the concentric reducer 20 is welded, as at 21, to the rear of the forged flange 18 which, as illustrated in the drawings, is specially fabricated to have an outside diameter, a thickness and a bolt circle design generally corresponding to the same design parameters of the flange 16.

It will be appreciated, therefore, that since the flange 18 should have an outside diameter about the same as the other flange 16 and that their respective bolt circle designs must correspond, the larger end of the reducer 20 is limited to a pipe size having an outside diameter which is preferably about equal or somewhat less than the diameter of the bolt circles of the flanges. Those skilled in the art will, of course, recognize that standard designs of commercially-available forged pipe flanges simply do not meet these requirements. Thus, to best achieve the objects of the present invention, the flange 18 must be especially fabricated. It will be noted, of course, that the flange 18 is fabricated so as to provide sufficient metal strength around the bolt holes, as at 22, which is commensurate with the design criteria of the other flange 16. It should be further noted that because of the approximate correspondence of the bolt circle diameter and the diameter of the larger end of the reducer 20, the bolt holes 22 are drilled only partway through the flange 18 and terminated short of the rear face of the flange. This, of course, necessitates that the bolt holes 22 be threaded for threaded engagement with the standard stud bolts, as at 14. It will also be noted in FIG. 1 that the rear face of the fabricated flange 18 is preferably provided with a boss, as at 23, which is appropriately beveled to match the larger end of the reducer 20 and provide sufficient metal reinforcement in the vicinity of the weld 21 to guard against warping of the flange face.

The third part of the valve body 13 is comprised of a thick annular member 24 having flat, parallel faces 25 and 26 which are appropriately machined for sealing engagement with the forward faces of the flange 18 and, for example, the flange 16 respectively. As illustrated in FIG. 1, the outer diameter of the annular member 24 is selected to permit the annular member to be fully disposed within the confines of the several stud bolts, as at 14, when they are securing the flanges 16 and 18 to one another. The significance of this selection will be subsequently explained.

To achieve the objects of the present invention, the annular body member 24 is cooperatively formed so that its internal bore, as at 27, is substantially equal to the internal diameter of the flange 16. Two coaxial counterbores or recesses 28 and 29 are formed in the rear face 25 of the annular member 24; and the smaller of these coaxial recesses is cooperatively sized for fully receiving a circular disc-like valve member 30 which is pivotally mounted on the annular member for swinging between its illustrated vertical position and the generally-horizontal position represented by the dashed lines at 31 in FIG. 1. As illustrated, the forward face of the pivoted valve member 30 is machined flat and the perimeter of this face is adapted for seating engagement against an annular valve seat 32 provided by the flat, rearwardly-directed shoulder defined between the internal bore 27 and the smaller coaxial counterbore 28. To provide sealing engagement between the valve seat 32 and the forward face of the valve member 30, sealing means are provided such as an O-ring 33 which is disposed in a complementary coaxial groove formed in the annular body member 24 around the annular valve seat.

Figure 2:
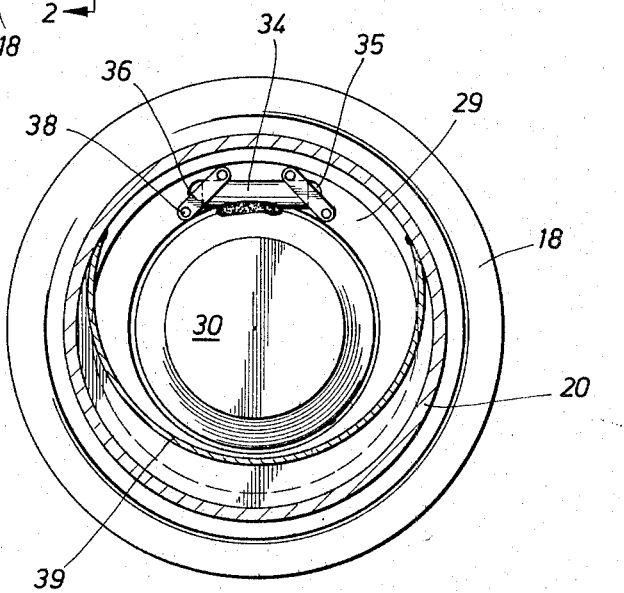
FIG. 2 is a cross-sectional view taken along the lines 2—2 of FIG. 1.

As best seen in FIG. 2, the valve member 30 is pivotally coupled to the annular body member 24 by a transversely-oriented pin 34 which is tangentially secured across the upper edge of the valve disc and rotatably disposed in an elongated recess 35 which is formed horizontally across the top of the rear face of the enlarged counterbore 29 and partially cuts across the top of the smaller counterbore 28. In the preferred manner of releasably securing the valve member 30 to the annular body member 24, a pair of restraining straps 36 and 37 are extended across the opposite ends of the elongated recess 35 and secured, as by screws 38, to the annular member to trap the pin 34 in its recess. As best seen in FIG. 1, the counterbores 28 and 29 are of sufficient depth to insure that the rear face of the valve disc 30 is at least flush, if not slightly recessed, within the rear face 25 of the annular body member 24 when the valve disc is seated on the valve seat 32.

Where the new and improved full-opening valve 10 of the present invention is to be installed in a pipeline where spherical pipeline pigs (not shown) are to be employed, it will be appreciated that as one of these spheres moves between the valve seat 32 and the downstream end piece 19, there will be appreciable annular clearance between the exterior of the sphere and the interior wall of the reducer 20. Those skilled in the art will, of course, recognize that if this clearance is quite substantial, there is a distinct risk that the sphere will be slowed to such an extent as it attempts to force the swinging disc 30 fully open that the sphere will be halted in the reducer 20 instead of progressing on into the downstream pipeline section 12. Accordingly, to reduce the fluid bypass area around a sphere passing through this portion of the new and improved valve 10, a suitably-shaped arcuate plate 39 is mounted in an upturned position across the bottom of the internal bores of the flange 18 and the reducer 20 and secured there as by a weld 40. It will be appreciated from FIG. 2 that this guide plate 39 will significantly reduce the amount of fluid bypass area around a sphere passing through the valve 10.

Accordingly, with the new and improved full-opening valve 10 assembled as illustrated in FIG. 1 and welded to the two pipeline sections 11 and 12, it will be appreciated that the valve will function to pass pipeline fluids from left to right as viewed in the drawing. The actual position of the swinging disc 30 will, of course, be dependent upon the flow rate, the nature of the pipeline fluids, and the weight and surface area of the valve disc. Thus, when either a spherical or an elongated cylindrical pipeline pig (not shown) enters the upstream flange 16, its leading end will encounter the forward face of the valve disc 30 while it is at least partially raised off of the valve seat 32. The continued movement of the pipeline pig will progressively elevate the swinging valve disc 30 to the position depicted by the dashed lines 31 so as to completely remove the valve disc from the central flow passage through the valve body 13. As previously noted, the upturned arcuate guide plate 39 will greatly reduce the annular clearance around the pipeline pig to further assure that there is a sufficient pressure differential acting across the pig to continue to force it on into the downstream pipeline section 12.

As previously mentioned, the pipeline check valves provided heretofore have not been suited for selective repositioning of their valve discs even should it be determined that better pipeline pigging operations could be realized by orienting these valve discs to swing in a non-vertical plane. In keeping with the objects of the present invention, therefore, it will be appreciated that the new and improved check valve 10 is uniquely arranged so that the annular body member 24 can be selectively positioned to any desired angular position with a minimum of difficulty and without removing the valve from the pipeline. To accomplish this, once the pressure is relieved in the pipeline, the several bolt studs 14 are partially loosened and the annular body member 24 is rotated in relation to the other body members 16 and 17 until the annular member is in a selected angular position. Once the bolt studs 14 are retightened, the valve 10 is, of course, again ready for service. Thus, the new and improved valve 10 can be selectively adjusted to assure that the pivoted disc 30 can be opened with a minimum of force by the passage of a pipeline pig through the full-bore valve. It will, of course, be appreciated that this unique arrangement of the multi-part body 13 will also facilitate the removal of the annular body member 24 and its associated valve disc 30 for either inspection or replacement.

Figure 3:
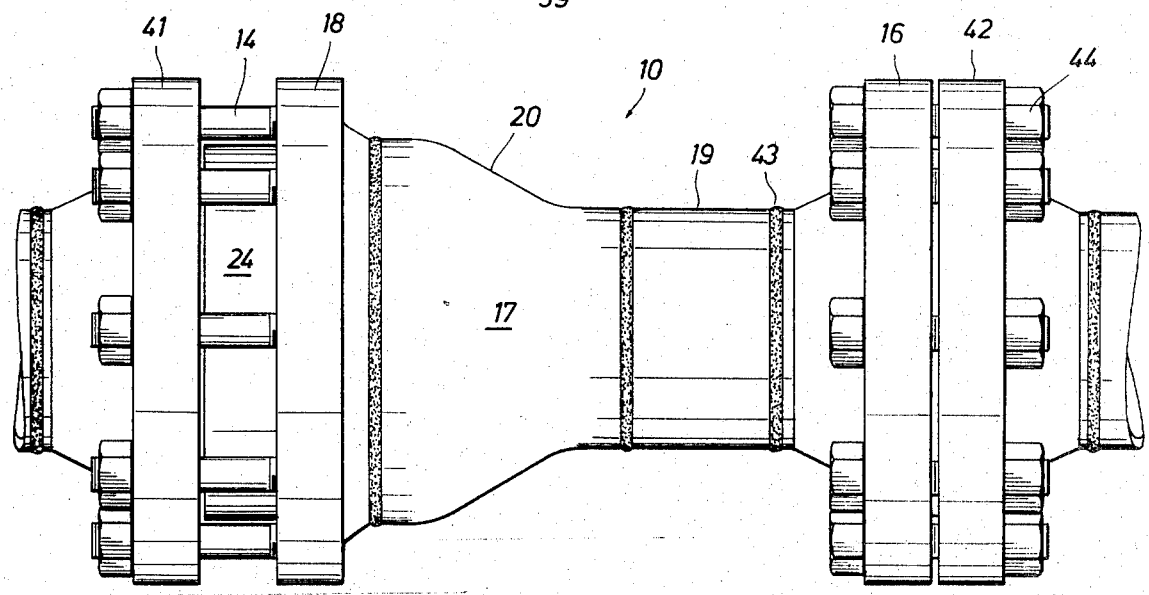
FIG. 3 shows the new and improved check valve of the present invention as it will appear when it is arranged for mounting between a pair of opposed pipeline flanges.

Turning now to FIG. 3, the new and improved check valve 10 of the present invention is illustrated with its several body members 16, 17 and 24 rearranged so as to permit the valve to be installed between a spaced pair of opposed pipeline flanges, as at 41 and 42. As depicted, the welding neck flange 16 has been welded, as at 43, to the smaller-diameter end portion 19 of the tubular body member 17 and the annular body member 24 is disposed between the upstream pipeline flange 41 and the specially-fabricated flange 18. The stud bolts 14 are employed for securing the valve body 13 to the upstream flange 41; and other bolts or studs, as at 44, are employed for bolting the welding neck flange 16 to the downstream pipeline flange 42. It will, therefore, be appreciated by those skilled in the art that by virtue of this unique design of the check valve 10, the body 13 can be selectively arranged so as to permit it to be alternatively connected into a pipeline by either welding as depicted in FIG. 1 or by connecting it between opposed pipeline flanges as shown at 41 and 42 in FIG. 3. The operation of the full-opening valve 10 will, of course, be the same in either instance.

As a further feature of the present invention, it will be appreciated that the overall combined length of the three body members 16, 17 and 24 is the same regardless of which body style they are to be arranged into. Those skilled in the art will, of course, appreciate that for a given pipe size and pressure rating, the standard overall lengths of weld-end valves and flanged valves which have been established by industry are identical. Thus, by virtue of the unique arrangement of the three body members 16, 17 and 24, their combined length will be equal to the standard established by industry for valves of a given pipe size and pressure rating. It will be recognized, of course, that the length of the small-diameter end member 19 is selected so as to obtain the particular length required for valves of a given pipe size and pressure rating.

Accordingly, it will be appreciated that the new and improved full-opening valves of the present invention are uniquely arranged for assembly as either a flanged-end valve or a welding-end valve of standard overall length. By virtue of this, a given valve of the invention can be assembled as dictated by the requirements of a particular pipeline installation and will not require stocking of two different body styles of what would otherwise be identical valves. The savings provided by this feature are readily apparent. Moreover, by virtue of the unique design of the full-opening check valves of the present invention, the pivoted valve disc can be readily removed or repositioned without removing the other parts of the valve body from the pipeline. Hereagain, the advantages of this unique arrangement are readily apparent.

Of paramount importance to the present invention, it will be recognized that by arranging each of the body members to have an internal bore substantially equal to the internal diameter of the associated pipeline, the full-opening valve will be particularly adapted for pipeline pigging operations.

While only a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A full-opening check valve adapted for coupling into a pipeline of a given pipe size and internal diameter through which pipeline pigs are to be passed and comprising: a tubular first body member including a symmetrical portion diverging uniformly from a downstream end having an internal diameter substantially equal to said given diameter to an upstream end having a larger internal diameter with an annular flange thereon having a plurality of first bolt holes arranged therein in a first bolt circle in accordance with industry standards for pipe flanges of said given pipe size; an annular second body member having an external diameter less than the diameter of said first bolt circle and adapted for mounting in coincidental alignment with said annular flange, said second body member having an internal diameter substantially equal to said given diameter and a coaxial counterbore in its downstream face defining a coaxial valve seat; a circular valve disc adapted for reception in said counterbore in seating engagement with said valve seat; means pivotally coupling said valve disc to said second body member for pivotal movement between a closed position within said counterbore and an open position where said valve disc is extended downstream of said valve seat within said upstream end of said first body member; an annular flanged third body member adapted to be coupled to one of said ends of said first body member and in coincidental alignment therewith, said third body member having an internal diameter substantially equal to said given diameter and a plurality of second bolt holes arranged therein in a second bolt circle substantially corresponding to said first bolt circle; and guide means mounted within the lower portion of said upstream end of said first body member and cooperatively arranged for guiding pipeline pigs passing from said second body member into said first body member.

2. The full-opening check valve of claim 1 wherein said symmetrical portion of said first body member includes a concentric welding reducer arranged in accordance with industry standards.

3. The full-opening check valve of claim 1 wherein said third body member is a pipe flange of said given pipe size arranged in accordance with industry standards for welding flanges.

4. The full-opening check valve of claim 1 further including a section of pipe of said given pipe size welded to one of said first and third body members and in coincidental alignment therewith, the length of said pipe section being selected so that the combined length of said body members and said pipe section will equal the overall length of valves of said given pipe size as established by industry standards.

5. The full-opening check valve of claim 4 wherein said one body member is said first body member and said pipe section is welded to said downstream end of said symmetrical portion.

6. The full-opening check valve of claim 1 wherein said third body member is a pipe flange of said given pipe size arranged in accordance with industry standards for welding flanges and is mounted on said downstream end of said first body member; and further including weld means cooperatively joining said third body member to said downstream end of said first body member.

7. The full-opening check valve of claim 1 wherein said third body member is a pipe flange of said given pipe size arranged in accordance with industry standards for welding flanges and is mounted on the upstream face of said second body member; and further including a plurality of bolts in said first and second bolt holes securing said first and third body members to one another with said second body member clamped therebetween.

8. A full-opening check valve adapted for welding into a pipeline of a given pipe size and internal diameter through which pipeline pigs are to be passed and comprising: a tubular downstream body member including a concentric welding reducer arranged in accordance with industry standards having a downstream end with an internal diameter substantially equal to said given diameter and a larger-diameter end, an annular flange welded on said larger-diameter end and having a plurality of first bolt holes arranged therein in a first bolt circle in accordance with industry standards for pipe flanges of said given pipe size, and guide means mounted within the lower portion of said larger-diameter end and cooperatively arranged for guiding pipeline pigs into said downstream end; a tubular upstream body member including a welding flange of said given pipe size arranged in accordance with industry standards for welding flanges and having a plurality of second bolt holes arranged therein in a second bolt circle substantially corresponding to said first bolt circle; an annular intermediate body member having an external diameter less than the diameter of said bolt circles and mounted between said flanges and in coincidental alignment therewith, said intermediate body member having an internal diameter substantially equal to said given diameter and a coaxial counterbore in its downstream face defining a coaxial valve seat; a circular valve disc adapted for reception in said counterbore in seating engagement with said valve seat; and means pivotally coupling said valve disc to said intermediate body member for pivotal movement between a closed position within said counterbore and an open position where said valve disc is extended downstream of said valve seat and over said guide means within said downstream body member.

9. The full-opening check valve of claim 8 further including a plurality of bolts in said first and second bolt holes securing said flanges to one another with said intermediate body member clamped therebetween.

10. The full-opening check valve of claim 9 wherein said first bolt holes extend only partway into said annular flange from the upstream face thereof and are threaded for threadingly engaging said bolts.

11. The full-opening check valve of claim 8 further including a section of pipe of said given pipe size welded to one of said tubular body members and in coincidental alignment therewith, the length of said pipe section being selected so that the combined length of said body members and said pipe section will substantially equal the overall length of weld-end valves of said given pipe size as established by industry standards.

12. The full-opening check valve of claim 11 wherein said one tubular body member is said downstream member and said pipe section is welded to said downstream end of said concentric welding reducer.

13. The full-opening check valve of claim 8 wherein said coupling means include a transverse pivot pin mounted across the top of said valve disc, and a transverse recess formed in said downstream face of said intermediate body member receiving said pivot pin and cooperatively defining a pivot surface for pivotally supporting said pivot pin.

14. A full-opening check valve adapted for mounting between opposed upstream and downstream flanges in a pipeline of a given pipe size and internal diameter through which pipeline pigs are to be passed and comprising: a tubular downstream body member including a concentric welding reducer arranged in accordance with industry standards having a downstream end with an internal diameter substantially equal to said given diameter and a larger-diameter end, an annular flange welded on said larger-diameter end and having a plurality of first bolt holes arranged therein in a first bolt circle in accordance with industry standards for pipe flanges of said given pipe size, a welding flange of said given pipe size arranged in accordance with industry standards for welding flanges and having a plurality of second bolt holes arranged therein in a second bolt circle substantially corresponding to said first bolt circle so that said welding flange can be bolted to a downstream flange in a pipeline, means including weld means cooperatively joining said welding flange to said downstream end of said welding reducer, and guide means mounted within the lower portion of said larger-diameter end of said welding reducer and cooperatively arranged for guiding pipeline pigs into said downstream end of said welding reducer; an annular body member having an external diameter less than the diameter of said bolt circles and adapted for mounting between an upstream pipeline flange and said annular flange, said annular body member having an internal diameter substantially equal to said given diameter and a coaxial counterbore in its downstream face defining a coaxial valve seat; a circular valve disc adapted for reception in said counterbore in seating engagement with said valve seat; and means pivotally coupling said valve disc to said annular body member for pivotal movement between a closed position within said counterbore and an open position where said valve disc is extended downstream of said valve seat and over said guide means within said downstream body member.

15. The full-opening check valve of claim 14 wherein said first bolt holes extend only partway into said annular flange from the upstream face thereof and are threaded for threadingly receiving one end of flange bolts securing said annular flange to an upstream pipeline flange.

16. The full-opening check valve of claim 14 wherein said means cooperatively joining said welding flange further include a section of pipe of said given pipe size joining said welding flange to said downstream end of said welding reducer, the length of said pipe section being selected so that the combined length of said body members and said pipe section will substantially equal the overall length of flanged-end valves of said given pipe size as established by industry standards.

17. The full-opening check valve of claim 14 wherein said coupling means include a transverse pivot pin mounted across the top of said valve disc, and a transverse recess formed in said downstream face of said annular body member receiving said pivot pin and cooperatively defining a pivot surface for pivotally supporting said pivot pin.

* * * * *